(12) United States Patent
Hendrickson

(10) Patent No.: US 7,239,439 B1
(45) Date of Patent: Jul. 3, 2007

(54) COMMUNICATION SYSTEM USING VARIABLE PATTERN ACOUSTO-OPTIC MODULATION

(75) Inventor: Lief M. Hendrickson, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/064,666

(22) Filed: Feb. 23, 2005

(51) Int. Cl.
*G03F 1/33* (2006.01)

(52) U.S. Cl. ............ 359/305; 359/285; 359/311
(58) Field of Classification Search ........... 359/285, 359/286, 305, 308, 310, 311, 314, 316; 398/133, 398/183
See application file for complete search history.

(56) References Cited

U.S. PATENT DOCUMENTS

| | | | | |
|---|---|---|---|---|
| 4,174,634 A | * | 11/1979 | Dory | 73/606 |
| 5,463,593 A | * | 10/1995 | Zanelli et al. | 367/13 |
| 5,561,524 A | * | 10/1996 | Yamasaki et al. | 356/493 |

OTHER PUBLICATIONS

Lief Milton Hendrickson, "Study of Acoustic Scattering from a Curved Surface Using the Schlieren Method" A Thesis Presented to the Faculty of San Diego State University Apr. 26, 1994 San Diego California.

* cited by examiner

*Primary Examiner*—Hung Dang
*Assistant Examiner*—Joseph Martinez
(74) *Attorney, Agent, or Firm*—Peter A. Lipovsky; Michael A. Kagan; Allan Y. Lee

(57) ABSTRACT

A communication system uses a beam of light; a beam expanding lens; a lens for collimating the expanded beam into a column of collimated light; a plurality of acoustic transducers to project acoustic emanations perpendicularly to the column of collimated light, wherein each of the acoustic transducers is placed with respect to the column of collimated light to affect a different region of the column; a lens for collecting the collimated light from the collimating lens and light as affected by the acoustic emanation, wherein the collimating lens focuses the collected collimated light at a focal region; an optical filter at the focal region to separate the light as affected by the transducers from light not so affected; and a detector for detecting the light affected by the acoustic emanations.

19 Claims, 4 Drawing Sheets

Cross Section of Collimated Light Beam in Plane S1

Transducer P1 turned on

Strobed portion of acoustic beam from P1 at time T1. This will show up as a spot when processed at the receiving end.

Strobed Acoustic Beam

Strobed image from P1 at time T1

Strobed image from P2 at time T2

Strobed image from P3 at time T3

Pattern of a 3x3 array of spots

Three of the spots turned on

COMMUNICATION SYSTEM USING VARIABLE PATTERN ACOUSTO-OPTIC MODULATION

INCORPORATION BY REFERENCE

The following publication is incorporated by reference: Hendrickson, Lief Milton, "Study of Acoustic Scattering from a Curved Surface using the Schlieren Method", Thesis (M.S.) San Diego State University 1994.

BACKGROUND OF THE INVENTION

This invention relates generally to communications and, in particular, to a communications system employing acoustically modulated optical signals.

It is desirable to send communication signals by light in a manner in which the information content of the signals cannot be understood by a party other than the intended recipient.

SUMMARY

A communication system includes a light source to project a beam of light; a beam expanding lens for expanding the beam of light; a collimating lens for collimating the expanded beam of light into a column of collimated light; a plurality of acoustic transducers to project acoustic emanations in a direction substantially perpendicular to the column of collimated light, wherein each of the acoustic transducers are placed in a location with respect to the column of collimated light so that each acoustic transducer affects a different region of the column of collimated light; a collecting lens for collecting the collimated light from the collimating lens and light as affected by the acoustic emanations, wherein the collecting lens focuses the collected collimated light at a focal region; an optical filter at the focal region for separating light affected by the acoustic transducers from light not so affected; and a detector for detecting the light as affected by the transducers.

By acoustically modulating the transmitted light in an intended manner, communication can be conducted between those sending the acoustically modulated signals and those intended to receive those signals.

Other objects, advantages and new features will become apparent from the following detailed description when considered in conjunction with the accompanied drawings.

DESCRIPTION

Figure 1:
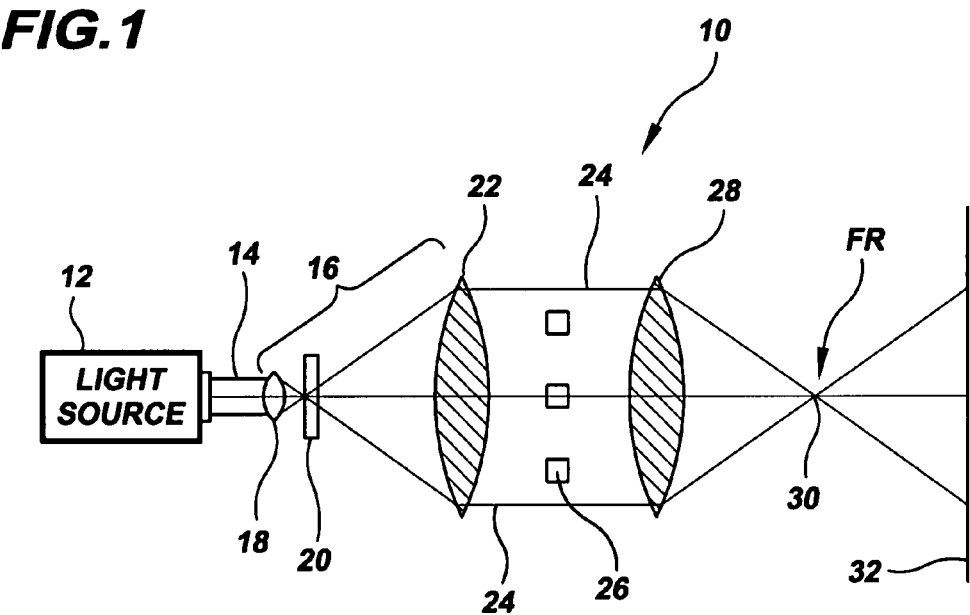
FIG. 1 is a side view of an exemplary communications system according to the description herein.

Referring now to FIG. 1, a communication system 10 according to the description herein includes a light source 12, which for example can be a laser or other source of electro-magnetic radiation having wavelengths within or outside the range known as visible light.

Light source 12 projects a beam of light 14 into a beam-expanding section 16 such as one having a beam expanding lens 18, shown here as a convex lens. An optional "spatial filter" 20, such as an opaque screen with a pinhole co-located at the focal region of convex lens 18, may be used to "cleanse" the light beam by absorbing light rays that do not pass through the pinhole. An alternate method of expanding the beam is through use of a concave lens (not shown) as a substitute for convex lens 18 in which case the "spatial filter" would not be used.

Light beam 14, passing through expanding section 16, is expanded to project on collimating lens 22, such as a convex lens, that collimates the expanded beam into column of light 24. As will be described in greater detail, a plurality of acoustic transducers 26 is positioned to project acoustic emanations in a direction that is substantially perpendicular to collimated light column 24.

The plurality of acoustic transducers 26 is positioned so that their acoustic emanations send acoustic waves in a direction perpendicular to the longitudinal axis of light column 24. Each of these transducers 26 is positioned in a location with respect to light column 24 so that each transducer affects a different region of light column 24. The transducers create acoustic waves, which will affect the transmission of light within distinct regions within light column 24. Other mechanisms may be employed to create separate and independent groups of acoustic wave trains within light column 24.

The individual transducers 26 are not required to be in the same plane. They could be in separate planes perpendicular to the axis of light column 24 where these separate perpendicular planes are at different positions along the longitudinal axis of light column 24.

Confining column 24 is a collecting lens 28, such as a convex lens, that collects the parallel, collimated, light from lens 22 as well as light that has been affected by the acoustic emanations. Lens 28 focuses at a focal region identified in the figure as FR the collected collimated light from regions of light column 24 that contain light rays which in the course of their transit through the light column did not pass through a region where acoustic emanations were present. Regions of light column 24 that did pass where acoustic emanations were present will have the rays diffracted, or bent and will thereby be focused by lens 28 at points that are shifted away from focal region FR. Co-located in this focal region FR is a filter 30 that is designed to separate the collimated light arriving at this filter from light affected by the acoustic emanations.

Either of the two output components of filter 30 can be used for further processing. If the light affected by the acoustic emanations is the only light allowed to pass, an image of the light regions affected by the acoustic emanations will be bright in intensity (a "dark field" image). If light not affected by the acoustic emanations is the only light allowed to pass, an image will be formed in which regions affected by the acoustic emanations will be darker in intensity than the surrounding parts of the image (a "light field" image).

Output filter 30 can be chosen, for example, from the group including a knife edge block; a hole filter; an annulus filter; and a spot filter or another filter that selectively allows the passage of light passing through different regions of focal region FR. Whether the "dark field" or the "light field" approach is chosen, filter 30 is used to permit light signals to fall upon detector 32 which can be used for both output approaches, greater details of which will be presented herein. Such a detector can include, for example, an array of individual detection elements; a charge-coupled device (CCD) as well as a scanning detector such as those of the design typically found in paper copying technology, any of which can recognize different light intensities in different regions of the detected image.

Figure 2A:
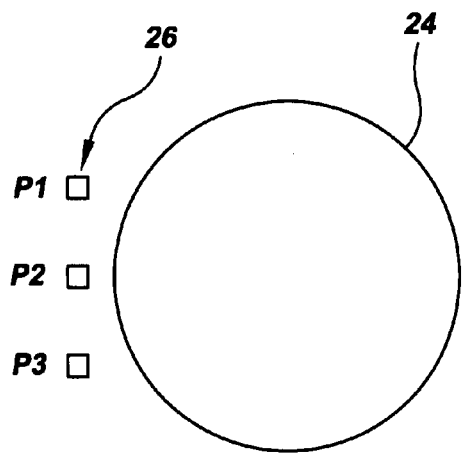
FIGS. 2A-C illustrate cross-section views of collimated light as described herein and as utilized with acoustic transducers according to the description herein.
Figure 2B:
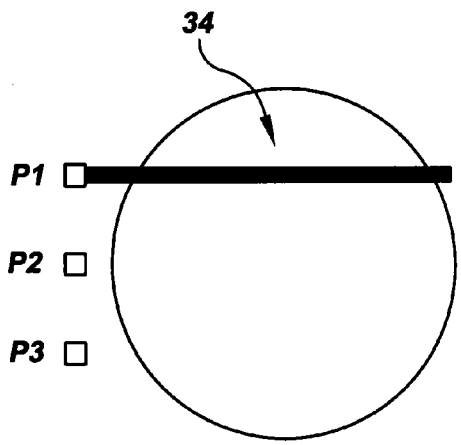
Figure 2C:
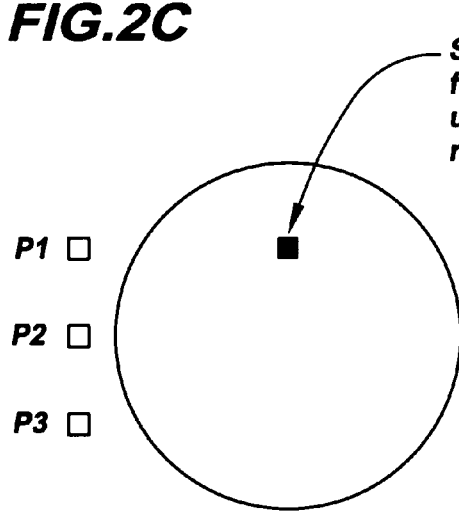

Referring now to FIGS. 2A-C, a representative cross-sectional view of collimated light 24 of FIG. 1 is presented, showing greater details of acoustic transducers 26 that are used to acoustically modulate the collimated light and that are ultimately employed to convey communications.

In FIG. 2A, an example arrangement of an exemplary number of acoustic transducers is shown. In this example, acoustic transducers 26, identified in this figure as P1-P3, are positioned to send acoustic emanations in a direction that is substantially perpendicular to collimated light column 24. Transducer P1 is positioned to affect a specific region of collimated light column 24, while transducers P2-P3 are positioned to affect different regions of light column 24. Devices (not shown) to reflect or scatter the acoustic beam may be employed to create various combinations of acoustic waves in the path of the light column.

Communication system 10 is designed to create images of regions where the light path is influenced by acoustic waves that are perpendicular to collimated light column 24. A detector is then used to capture the images produced wherein the transient variations in light intensity are created in specific regions of the detected image field. In the following description, these regions are referred to as "spots".

A signal is made possible through the use of "on" and "off" trains of acoustic waves. For example, P1 is turned "on" at time T1 with continuous acoustic waves produced for time interval DT1 and the process repeats, or strobes, at rate R1 for an amount of time required for the detector to register the "on" signal. FIG. 2B shows the path of acoustic wave train 34 while FIG. 2C reveals a frozen image of the same acoustic wave train made visible by strobing a light detector at the same rate, R1.

The next transducer in a predetermined sequence, for example P2, is turned on for time interval DT2 at time T2 with the process strobed at rate R2. Any of the transducers could supply the pulses individually or simultaneously at any time period. The sequence of this example is representative only. The pattern continues in the same manner for data sets of (P3, R3, T3, DT3), (P1, R1, T4, DT1), (P2, R2, T5; DT2), etc. The strobed pulses are synchronized to a predetermined pattern known to the detector-receiver.

Figure 3A:
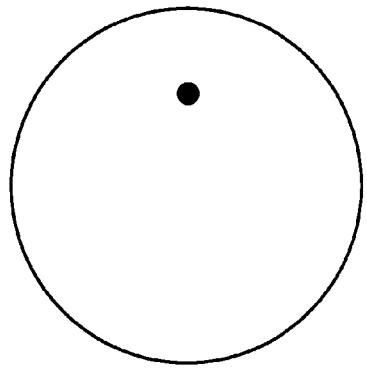
FIGS. 3A-C illustrate cross-section views of detector received exemplary optical images according to the description herein.
Figure 3B:
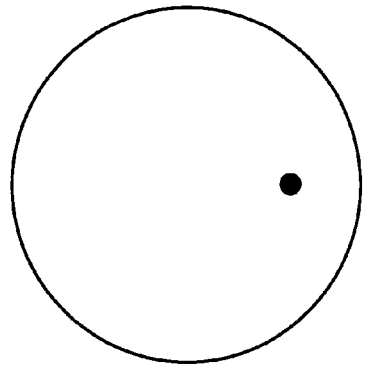
Figure 3C:
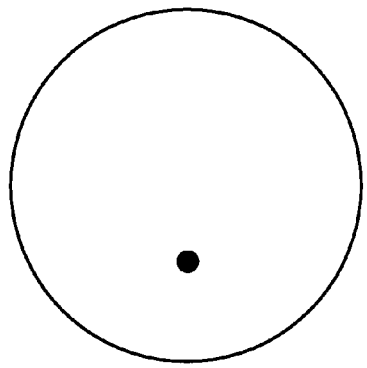

Referring now to FIGS. 3A-C, exemplary optical images as may be received at detector of FIG. 1 are shown. The detector plane will show spots corresponding to the strobed acoustic beams in the plane of the acoustic transducers. The time intervals and rates are adjusted to produce the representative spots shown on FIGS. 3A-C. Changing the time adjustments will alter the number, position, and size of the spots. The spots are visualized, for example, by a detector consisting of an array of individual light detection elements. To freeze a desired image at a prescribed location on the detector, detection of the light is strobed at a rate synchronized to the strobe rate of the acoustic transducers 26, represented here by transducers P1-P3. This can be accomplished by either strobing the light source, such as by passing the beam through an acousto optic modulator that is strobed to act as an "on or off" switch to passage of light; by use of a rotating disk with notches to allow passage of light, known as a light chopper; through the use of a switchable light source such as a diode laser; by other light switching mechanisms; or by strobing the sampling the light detectors at discrete intervals needed to interpret the message. In the case of strobing the sampling of the light detectors, the strobe rates of the individual transducers P1-P3, can be independent of each other with the row of detectors coinciding to each transducer strobing at the same rate of the transducer. Such strobing will freeze the image of spots, making them visible to those with information about the frequencies and strobe rates applied to the plurality of acoustic transducers 26.

The locations of the spots at particular times can be used to convey messages. The sender's signal is applied to the plurality of transducers 26. The receiver obtains the signal information from the image of spots, either a "dark field" or "light field" at detector 32. The light detectors within the field of view record light intensity at specific time sampling intervals. The spot pattern created by the sender can include any number of discrete spots depending on the number of acoustic transducers and the timing of their usage.

Figure 4A:
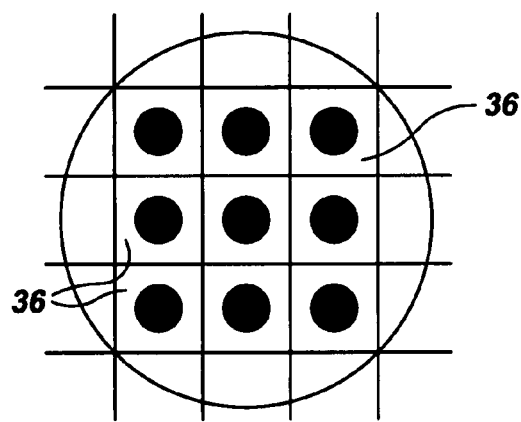
FIGS. 4A-B show exemplary detector and image examples according to the description herein.
Figure 4B:
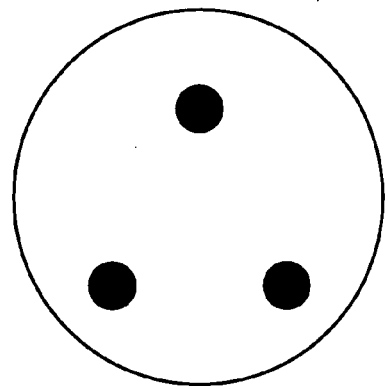

Referring to FIG. 4, as an example, consider a spot array of 3×3 detector elements 36 for a total of nine individual elements. FIG. 4A shows all nine spots illuminated (shown with a superimposed grid). FIG. 4B shows three spots (chosen arbitrarily) illuminated. The actual spots will show up as regions of light on a dark background if a "dark field" method is used or as the negative of the images if a "light field" method were used. The image from the light field method is shown here for greater simplicity of illustration. The dark field image would be the negative of this light field image. In this example, the receiver detector array has individual light detection elements at the center of each grid square to detect when each spot is illuminated.

These blinking spots can be used in numerous ways to communicate a signal or signals such as having the blinking spots represent ones and zeros of a binary message. For example, each individual spot location can communicate a message. In the example shown, nine independent messages can be sent simultaneously.

Alternatively, a combination of spots at each time instant can be an encoded portion of a signal. In such a case, there are $2^n$ possible combinations where 2 is the number of states of the spots (on or off) and the exponent n equals the number of illumination spots. For n=9, there are $2^9$=512 different possible patterns.

In another application, a detector array with 8 columns could be used with each row representing a single information byte. The rows could be successive bytes in the same message or independent messages.

The signal pattern could be in any order and could use simultaneous illumination of spots based on the use of multiple acoustic beams and/or reflectors employed by the sender. This arbitrary unique sequence generated by the sender is then interpreted using prescribed rules not known to any possible interceptors.

To reduce the possibility of detection, the intensity of the transmitted light could be lowered. Though the light might still be detected, visualization of the spot images would require knowing the timing sequence used to create the signal. Even if timing data were known, extraction of the message would be nearly impossible without knowledge of the message scheme. Interpretation of the signal would require an interceptor to know the frequency or frequencies and orientation of the acoustic beams used to modulate the light beam. The interceptor would have to know the strobe rate or rates to be able to obtain an image of the spots. If that were overcome, the coding coinciding to the blinking spot locations within the field would have to be known. The number of spots and time slots could be increased to achieve whatever level of security is desired.

The light column 24, as shown in FIG. 1, can be passed through a liquid, gas, or even a transparent solid. It can be envisioned that vibratory stress waves can be created within the transparent solid having an equivalent effect to the acoustic waves within a liquid or gas environment. Vibratory stress waves within separately partitioned regions of transparent solids could be used as an alternative method of creating independent light regions for affecting light passing there-through.

Obviously, many modifications and variations of the invention are possible in light of the above description. It is therefore to be understood that within the scope of the claims, the invention may be practiced otherwise than as has been specifically described.

What is claimed is:

1. A communication apparatus comprising:
    a light source for projecting a beam of light;
    a beam expanding lens for expanding said beam of light into an expanded beam of light;
    a collimating lens for collimating said expanded beam of light into a column of collimated light;
    a plurality of acoustic transducers for projecting acoustic emanations in a direction that is substantially perpendicular to said column of collimated light, each of said acoustic transducers being positioned in a preselected location with respect to said column of collimated light so that each said acoustic transducer affects a different region of said column of collimated light for making a modulated signal;
    a collecting lens for collecting said collimated light from said collimating lens and light as affected by said acoustic emanations, said collecting lens focusing said collected collimated light at a focal region;
    an optical filter at said focal region for filtering said collected light to separate light as affected by said acoustic transducers from light not so affected; and
    a detector for detecting said light as affected by said acoustic emanations, said detector including an array of individual detection elements that are positioned to coincide with said different regions of said column of collimated light.

2. The apparatus of claim 1 further including a spatial filter disposed between said light source and said collimating lens.

3. The apparatus of claim 2 wherein said spatial filter includes a beam expanding lens.

4. The apparatus of claim 3, wherein said spatial filter further includes a pin hole filter.

5. The apparatus of claim 3 wherein said beam expanding lens is a convex lens.

6. The apparatus of claim 1 wherein said light source is a strobing light source.

7. The apparatus of claim 6 wherein said strobing light source is a laser strobed by an acoustical optic modulator.

8. The apparatus of claim 1 wherein said detector is a strobing detector.

9. The apparatus of claim 1 wherein said light source is a laser.

10. The apparatus of claim 1 wherein said first and second lenses are each convex lenses.

11. The apparatus of claim 1 wherein said beam expanding lens is a concave lens.

12. The apparatus of claim 1 wherein said optical filter is chosen from the group of a knife edge block, a hole filter; an annulus filter; and a spot filter.

13. A communication apparatus comprising:
    a laser for projecting a beam of light;
    a beam expanding lens for expanding said beam of light into an expanded beam of light;
    a convex collimating lens for collimating said expanded beam of light into a column of collimated light;
    a plurality of acoustic transducers for projecting acoustic emanations in a direction that is substantially perpendicular to said column of collimated light, each of said acoustic transducers being positioned in a preselected location with respect to said column of collimated light so that each said acoustic transducer affects a different portion of said column of collimated light for making a modulated signal;
    a convex collecting lens for collecting said collimated light from said collimating lens and light as affected by said acoustic emanations, said convex collecting lens focusing said collected collimated light at a focal region;
    an optical filter at said focal region for filtering said collected light to separate said light as affected by said acoustic transducers from light not so affected; and
    a detector for detecting said light affected by said acoustic emanations, said detector including an array of individual detection elements that are positioned to coincide with said different regions of said column of collimated light.

14. The apparatus of claim 13 further including a spatial filter disposed between said beam expanding lens and said convex collimating lens.

15. The apparatus of claim 14 wherein said spatial filter further includes a pin hole filter.

16. The apparatus of claim 13 wherein said detector is a strobing detector.

17. The apparatus of claim 13 wherein said beam expanding lens is a concave lens.

18. The apparatus of claim 13 wherein said beam expanding lens is a convex lens.

19. The apparatus of claim 13 wherein said optical filter is chosen from the group of a knife edge block, a hole filter, an annulus filter; and a spot filter.

* * * * *